(12) United States Patent
Nomiyama et al.

(10) Patent No.: US 6,896,407 B2
(45) Date of Patent: May 24, 2005

(54) TEMPERATURE INFORMATION DETECTING DEVICE FOR ANGLE SENSOR AND POSITION DETECTING DEVICE

(75) Inventors: Takashi Nomiyama, Tokyo (JP); Fumio Nagasaka, Tokyo (JP); Shinichi Akano, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/285,460

(22) Filed: Nov. 1, 2002

(65) Prior Publication Data

US 2003/0086470 A1 May 8, 2003

(30) Foreign Application Priority Data

Nov. 5, 2001 (JP) ........................................ 2001-339845

(51) Int. Cl.[7] .............................. G01K 7/24; G01B 7/30; H01L 43/08; G01R 33/09
(52) U.S. Cl. ...................... 374/142; 374/177; 374/183; 324/207.25; 324/207.21; 251/129.04
(58) Field of Search ............................ 374/6, 141, 142, 374/176, 177, 183; 33/1 PT, 1 N; 324/202, 207.11, 207.12, 207.19, 207.21, 207.25, 252; 251/129.04

(56) References Cited

U.S. PATENT DOCUMENTS

| | | | |
|---|---|---|---|
| 5,601,367 A | * | 2/1997 | Nara ........................... 374/183 |
| 5,621,320 A | * | 4/1997 | Yokotani et al. ............. 324/252 |
| 6,276,385 B1 | * | 8/2001 | Gassman ........................ 137/1 |
| 6,501,271 B1 | * | 12/2002 | Lenssen et al. ............. 324/252 |
| 6,655,652 B2 | * | 12/2003 | Meinhof ................. 251/129.04 |

FOREIGN PATENT DOCUMENTS

| | | | |
|---|---|---|---|
| DE | 93 12 612.3 | 11/1993 | |
| DE | 4313273 A1 | * 10/1994 | ............ G01D/3/04 |
| DE | 198 52 502 A1 | 5/2000 | |
| DE | 699 03 921 T2 | 11/2000 | |
| JP | 8-242027 A | 9/1996 | |
| JP | 11-083422 A | 3/1999 | |
| JP | 11-194160 A | 7/1999 | |
| JP | 2000-310504 A | 11/2000 | |
| WO | WO 01-50091 A1 | 7/2001 | |

OTHER PUBLICATIONS

Infineon Technologies AG, Application Note Jul. 2001, "Magnetic Sensors, Giant Magneto Resistors", pp. 1–18.

* cited by examiner

Primary Examiner—Diego Gutierrez
Assistant Examiner—Stanley J. Pruchnic, Jr.
(74) Attorney, Agent, or Firm—Rothwell, Figg, Ernst & Manbeck PC

(57) ABSTRACT

A temperature information detecting device for an angle sensor is provided for detecting only temperature-dependent components based on middle-point potentials when a constant current is supplied to a bridge circuit for an angle sensor, for acquiring a temperature of the angle sensor from the temperature-dependent components, for employing compensating information corresponding to the acquired temperature without separately providing any additional temperature sensor, and for making temperature compensation of the output of the temperature sensor in automatically controlling the valve opening of a flow control valve.

11 Claims, 5 Drawing Sheets

TEMPERATURE INFORMATION DETECTING DEVICE FOR ANGLE SENSOR AND POSITION DETECTING DEVICE

BACKGROUND OF THE INVENTION

1. Field of the Invention

This invention relates to a temperature information detecting device for an angle sensor and a position detecting device, more particularly to a temperature information detecting device for an angle sensor suitable for control of valve opening of a flow control valve and to a position detecting device using the temperature information detecting device.

2. Description of the Related Art

Conventionally, it has been made a habit in a flow control valve of detecting its valve opening by an angle sensor, of calculating the amount of control of the valve opening by the body of a positioner, a valve opening control device, based on the detected valve opening and a valve opening setting value given from the outside, and of automatically controlling the valve opening in order that it coincides with the valve opening setting value in accordance with the amount of control.

FIG. 3 is a block diagram showing the conventional flow control device.

Referring to FIG. 3 reference numeral 51 denotes a flow control valve, 52 denotes a yoke which fixes an air actuator 53 to the flow control valve 51, 54 denotes a valve driving shaft driven by the air actuator 53, 55 denotes a projecting pin provided at a predetermined position of the valve driving shaft 54, 56 denotes an angle sensor fixed to part of the yoke 52 for outputting a position signal in accordance with the valve opening, i.e., a valve position. Such angle sensor disclosed in Publication of Unexamined Japanese Patent Application No. 11-83422 has been placed in service, in which the angle sensor 56 is configured by combining a number of magnetic resistive elements into a bridge circuit, and input voltage is applied to two terminals facing each other, whereas output voltage is outputted from two other terminals facing each other.

Reference numeral 57 denotes a feedback lever for inputting to the angle sensor 56 opening information in accordance with the valve position of the flow control valve 51, whose one end is fixed to the axis of rotation of the angle sensor 56. The feedback lever 57 has a slit 57a formed thereon and the pin 55 is slidably engaged with the slit 57a for converting reciprocal motion of the valve driving shaft 54 into rotational motion of the angle sensor 56. Reference numeral 58 denotes the body of a positioner, the valve opening control device, which is housed together with the angle sensor 56 in a case fixed to the yoke 52, 59 denotes a sensor for detecting temperature information, which is arranged on a substrate constituting the body of the positioner 58. A compressed air supply, a source of control air, for activating the air actuator 53, is supplied from the outside to the body of the positioner 58 and a valve setting value is sent through communication from a remote controller. Also, a position signal in accordance with the valve position of the flow control valve 51 is inputted to the body of the positioner 58 outputted from the angle sensor 56.

The operation of the conventional flow control valve will now be described.

The body of the positioner 58 compares the position signal in accordance with the valve position of the flow control valve 51 detected by the angle sensor 56 with the valve opening setting value provided from the outside. Depending on the compared results, a control air signal generated from the compressed air is supplied to the air actuator 53 to drive the valve driving shaft 54 by the air actuator 53 to control flow of a fluid through the valve 51, by controlling the valve position of the flow control valve 51 in order that it coincides with the valve opening setting value given from the outside.

In case a temperature of the fluid to be flow controlled by the flow control valve 51 is greatly different from the normal temperature, the temperature of the body of the positioner 58 and the angle sensor 56 will presents a great difference from the normal temperature as a consequence of heat conduction from the flow control valve 51 through the yoke 52. Therefore, the output of the angle sensor will be varied due to a change in temperature characteristics of the magnetic resistive elements constituting the angle sensor 56. For this reason a temperature characteristic compensating calculation is performed for compensating variations in the output of the angle sensor 56, based on a signal detected by the temperature sensor 59, such as a thermistor mounted on the substrate of the body of the positioner 58. For example, the amplifier for magnetic resistive elements is applicable for this purpose, which is disclosed in Unexamined Japanese Patent Application No. 11-194160. In this case, because the body of the positioner 58 and the angle sensor 56 are housed in the same case, it may be considered that the temperature within this case is uniform. Additionally, the temperature sensor 59 is also used for temperature compensation of circuit elements mounted on the body of the positioner 58.

In the conventional flow control valve, the body of the positioner 58 and the angle sensor 56 are housed in the same case and the case is fixed to the yoke 52. Hence, the temperature sensor 59 is indispensable to a measurement of temperature within the case. However, there is a demand to separate the body of the positioner 58 from the angle sensor 56 and mount it to another place depending on mounting environments. Where the body of the positioner 58 is separated from the angle sensor 56, the temperature sensor 59 will detects only the temperature of the substrate of the body of the positioner 58, and the detected temperature cannot by any possibility be regarded as a temperature of the angle sensor 56 mounted on the another place.

Thus, in the structure where the body of the positioner 58 is separated from the angle sensor 56, another temperature sensor (not shown) similar to the temperature compensating sensor 59 has to be mounted in the vicinity of the bridge circuit consisting of the magnetic resistive elements for the angle sensor 56. As a result, the positioner must have a cable for conducting a position signal in accordance with the valve position of the flow control valve 51 outputted from the angle sensor 56 to the body of the positioner 58, and a separate cable for conducting temperature information obtained in the vicinity of the angle sensor 56 outputted from the newly provided temperature sensor, which complicates its structure.

Also, it has been popular to perform digital signal processing in the body of the positioner 58, by converting analog signals, such as a position signal sent from the angle sensor 56 or a temperature information signal sent from the temperature compensating sensor 59, into digital signals by an A/D converter. Multiple input signals to be A/D converted requires an A/D converter with many channels and results in increased cost.

SUMMARY OF THE INVENTION

The present invention has been made to solve the above problems and an object thereof is to provide a temperature information detecting device for an angle sensor capable of directly finding a temperature of the angle sensor without separately providing any additional temperature sensor.

A temperature compensating device for an angle sensor according to the present invention includes constant current supplying means for supplying a constant current to a bridge circuit; temperature information detecting means for acquiring temperature information in accordance with the temperature around the bridge circuit based on middle-point potentials of bridges of the bridge circuit.

Preferably, the temperature information detecting means acquires temperature information in accordance with the temperature around the bridge circuit based on the added result of the middle-point potentials of two bridges of the bridge circuit.

According to the present invention, it enables acquisition of the temperature information of the magnetic resistive elements of the angle sensor without separately providing any additional temperature sensor.

A position detecting device according to the present invention includes constant current supplying means for supplying a constant current to a bridge circuit; temperature information detecting means for acquiring temperature information around the bridge circuit based on middle-point potentials of two bridges of the bridge circuit.

Preferably, the temperature information detecting means acquires the temperature information around the bridge circuit based on the added result of the middle-point potentials of two bridges of the bridge circuit.

According to the present invention, it allows a temperature compensation with high accuracy for the output of the angle sensor based on the temperature information directly obtained from the added result of the middle-point potentials of two bridges of the bridge circuit.

BRIEF DESCRIPTION OF THE DRAWINGS

The above and other objects and the attendant advantages of the current invention will become readily apparent by reference to the following detailed description when considered in conjunction with the accompanying drawings wherein.

Throughout the figures, the same reference numerals, and characters, unless otherwise noted, are used to denote like features, elements, components, or portions of the illustrated embodiment.

DESCRIPTION OF THE PREFERRED EMBODIMENT

The preferred embodiment of the present invention will be described in details with reference to the attached drawings.

First Embodiment

The first embodiment is directed to detect the valve opening of a flow control valve based on the output of an angle sensor to which a constant current is supplied. Then, an automatic control is done so that the valve opening of the flow control valve coincides with the valve opening setting valve based on the detected valve opening and the valve opening setting value given from the outside. At this time, the temperature compensation is made by using the output of the angle sensor without separately providing any additional temperature sensor.

Figure 1:
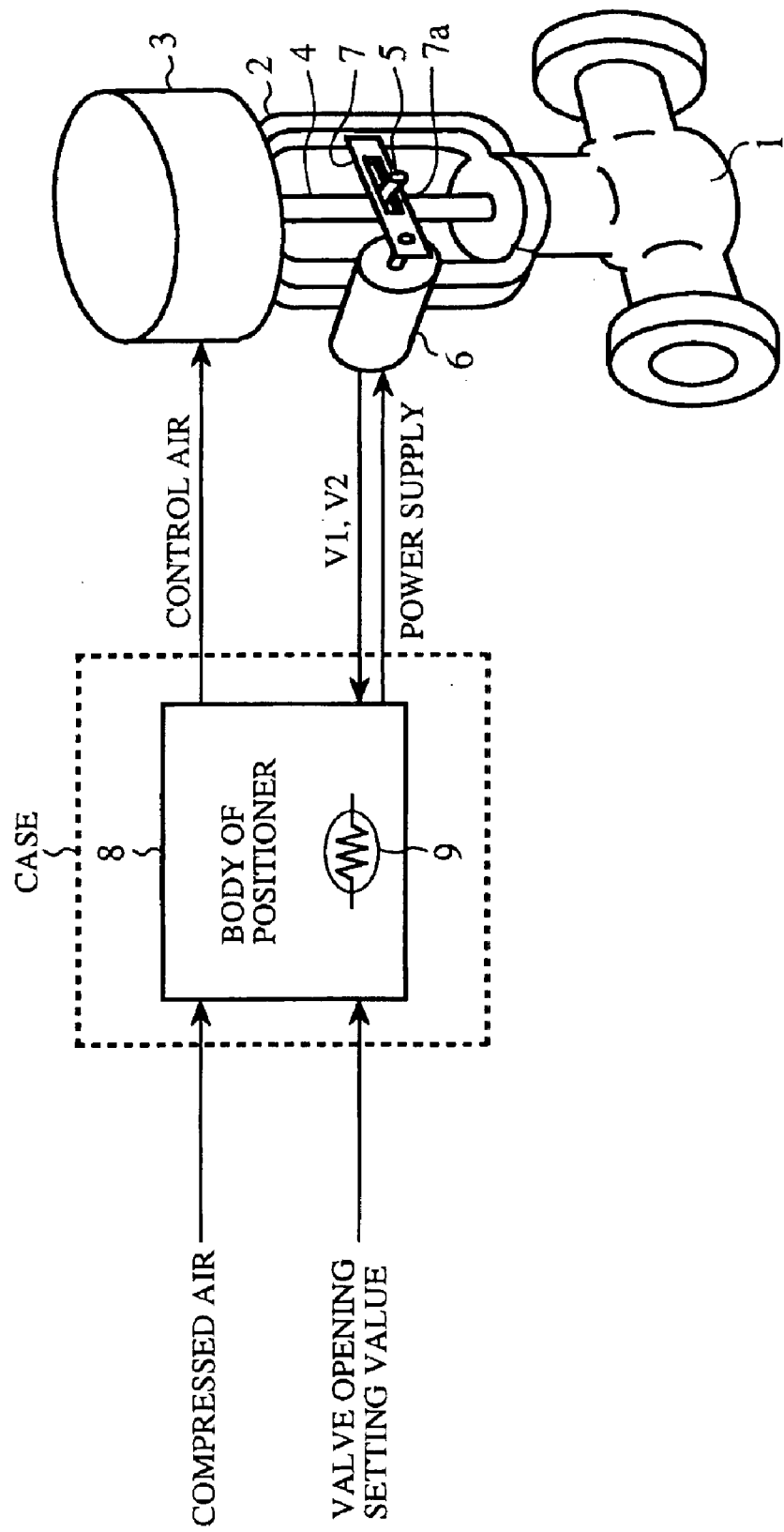
FIG. 1 is a block diagram showing a flow control valve having the structure where the body of the positioner is separated from the angle sensor, to which is applied the temperature information detecting device for the angle sensor and the position detecting device according to the first embodiment.

FIG. 1 is a block diagram showing the flow control valve having the structure where the body of the positioner is separated from the angle sensor, to which the temperature information detecting device for the angle sensor and the position detecting device of the first embodiment are applied. In comparison with the conventional FIG. 3, the first embodiment shown in FIG. 1 is different in that a case of the body of the positioner 8 is separately provided from that of the angle sensor 6, and that an internal structure of the body of the positioner 8 is different than the conventional positioner, but others are identical to each other.

Referring to FIG. 1, reference numeral 1 denotes a flow control valve, 3 denotes an air actuator, 2 denotes a yoke that binds and fixes the flow control valve 1 to the air actuator 3, 4 denotes a valve driving shaft linearly controlled by the air actuator 3, in which the valve opening of the flow control valve 1 is changed in accordance with a position of the valve driving shaft 4 to allow control of a flow of fluid. Reference numeral 5 denotes a projecting pin provided at a predetermined position of the valve driving shaft 4, 6 denotes an angle sensor fixed to part of the yoke 2, which outputs a position signal in accordance with the position of the valve opening of the flow control valve 1. The angle sensor is configured by binding a number of magnetic resistive elements into a bridge circuit, and a constant current is supplied to two first terminals facing each other, and an output current is outputted from two other terminals facing each other.

Reference numeral 7 denotes a feedback lever for rotating the the angle sensor 6 about its axis of rotation to an angle in accordance with the valve position of the flow control valve 1, whose one end is fixed to the axis of rotation of the angle sensor 6. The feedback lever 7 is provided with a slit 7a with which the pin 5 is slidably engaged. Through the mechanism where the pin 5 of the valve driving shaft 4 is engaged with the slit 7a formed on the feedback lever 7, linear reciprocation motion of the valve driving shaft 4 is converted into rotational motion of the axis of rotation of the angle sensor 6.

Figure 4:
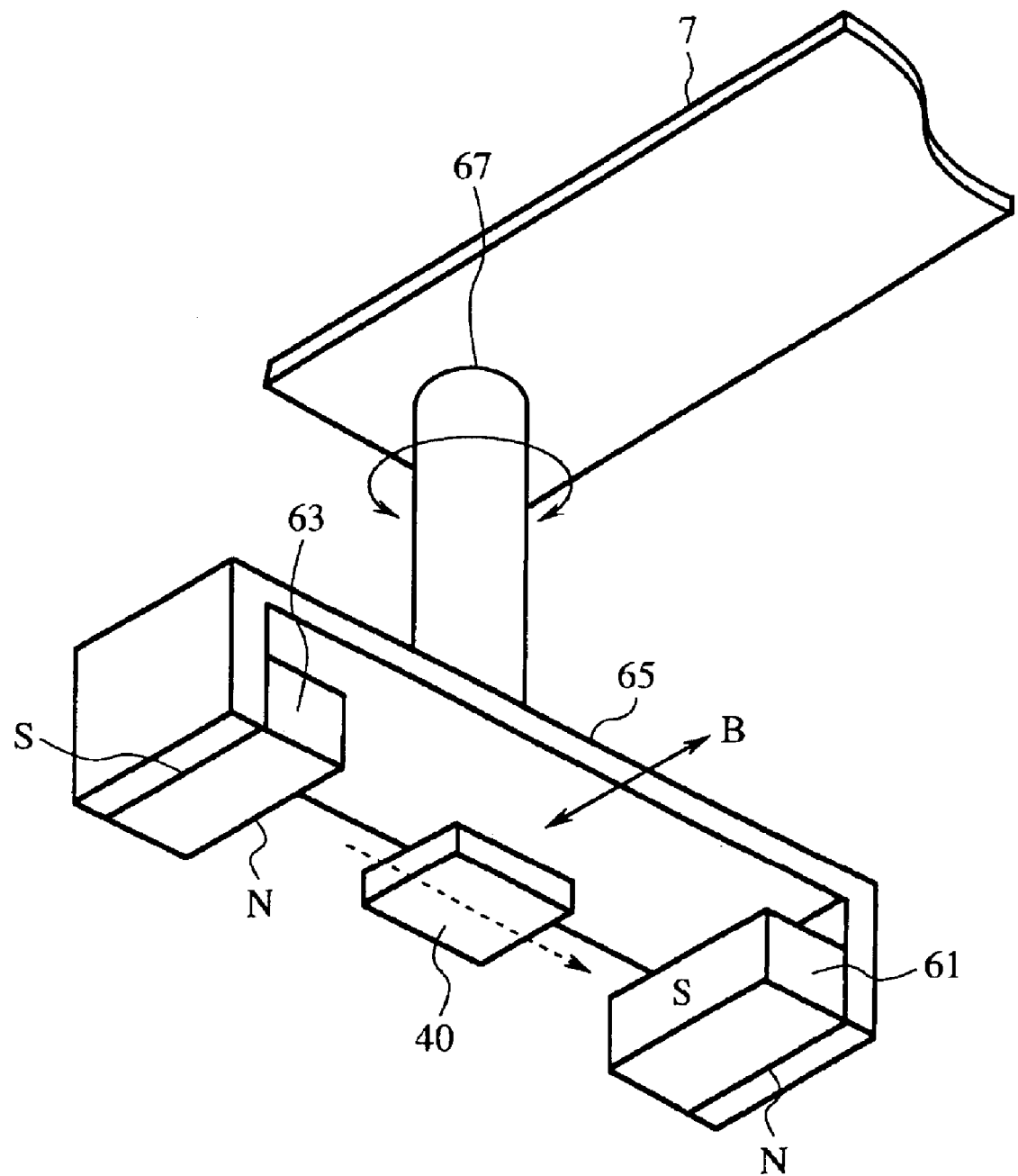
FIG. 4 is a perspective view of purviews showing the angle sensor.

FIG. 4 is a perspective view of the angle sensor.

In FIG. 4, an angle sensor 40 is fixed to mounting means (not shown), magnets 61, 63 are disposed on the right and left sides of a magnetic path forming body 65, and the center of the magnetic path forming body 65 is fixed to the axis of rotation 67. Where the angle sensor 40 is a magnetic sensor whose resistance value is varied when the direction of a line of magnetic force applied to both sides of the sensor is changed. The poles N,S of the magnets 61, 63 are arranged so that a line of magnetic force is in parallel with respect to both sides of the angle sensor 40. Upon rotating the axis of rotation 67, the magnets 61, 63 are rotated together with the magnetic path forming body 65 the angle sensor 40, which changes the direction of the line of magnetic force across the angle sensor 40, with the result that a resistance value of the angle sensor is changed. This detects the rotational angle of the axis of rotation 67.

Figure 5:
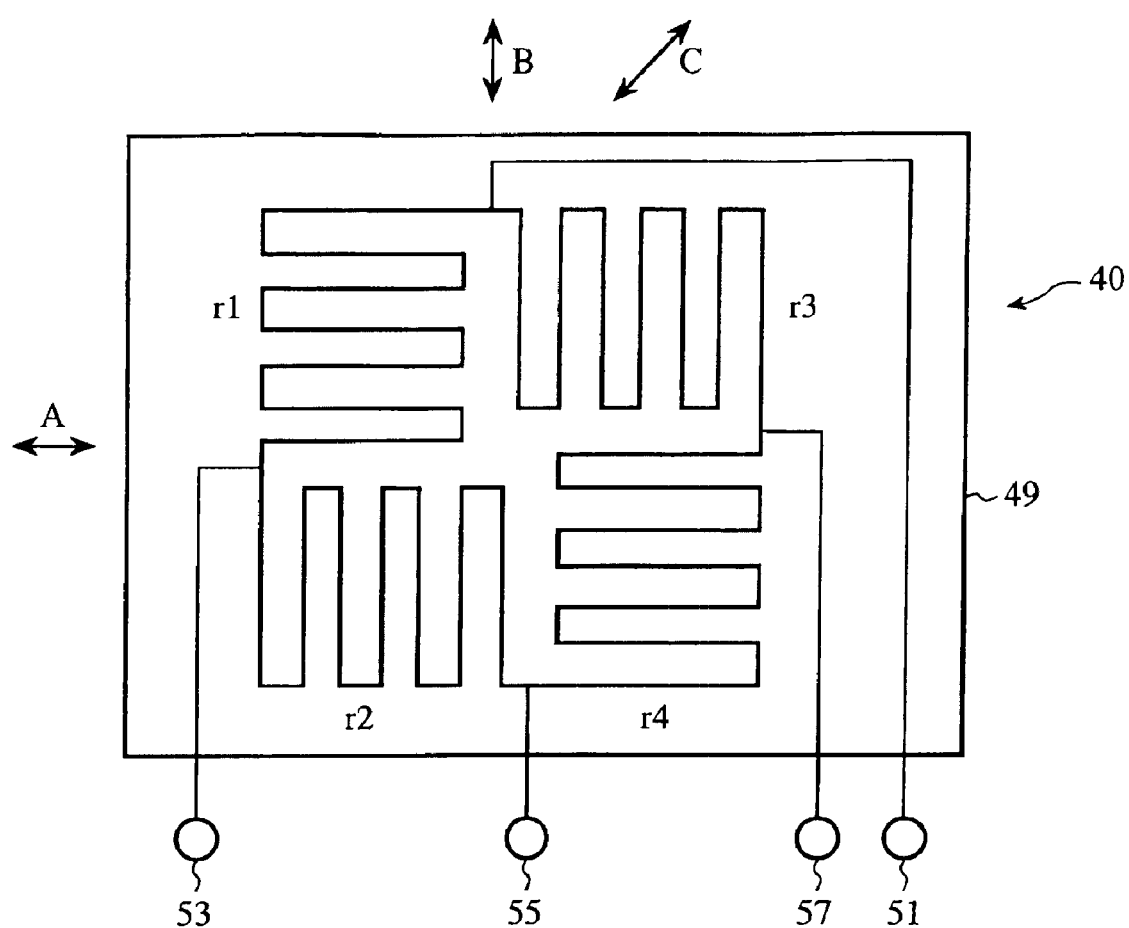
FIG. 5 is a plan view showing the magnetic resistive elements.

FIG. 5 is a plan view showing the magnetic resistive elements 40.

Figure 2:
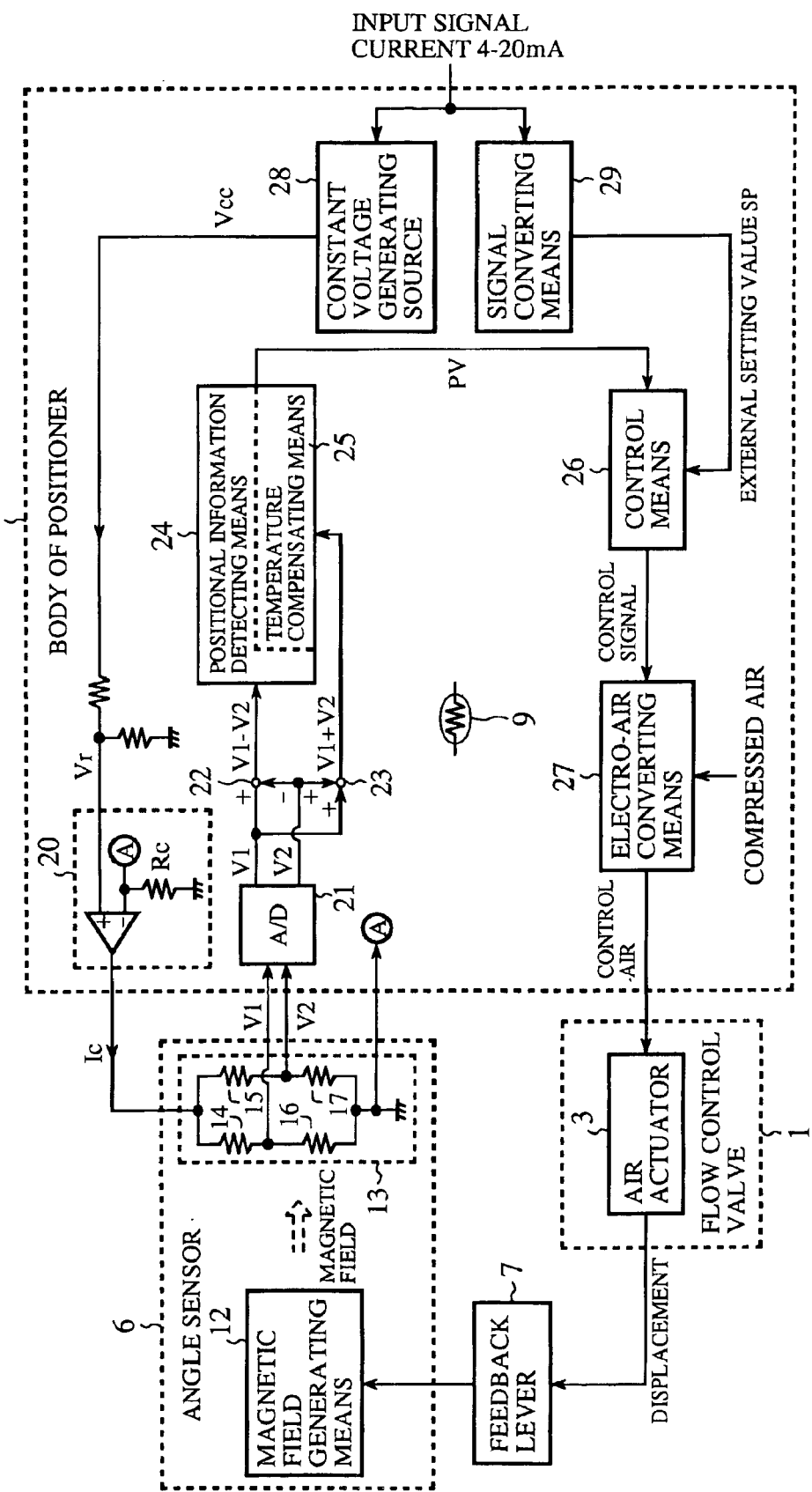
FIG. 2 is a system configuration for controlling the valve opening of the flow control valve 1 inclusive of the temperature information detecting device for the angle sensor and the position control device according to the first embodiment.

The magnetic resistive elements 40 is mounted on a substrate 49, in the form of point symmetry so that the zigzag direction of four zigzagged magnetic resistive element patterns r1–r4 is perpendicular mutually. Upon applying a magnetic field, e.g. in the direction denoted by arrow A shown in FIG. 5 the magnetic resistive element patterns r1,r4 formed in parallel thereto have a maximum resistance value, whereas the magnetic resistive element patterns r2,r3 formed in perpendicular thereto have a minimum resistance value. On the other hand, if the magnetic field is applied in the direction denoted by arrow B shown in FIG. 5, it will bring on opposite results to the above situation. The bridge circuit 13 shown in FIG. 2 is made up of these four magnetic resistive element patterns r1–r4, an input current is applied to two terminals 51,55 facing each other at one end of the magnetic resistive element 40, and an output current is outputted from two output terminals 53,57 facing each other at other end thereof. As shown in FIG. 4, upon rotating the axis of rotation 67 of the magnetic path formation body 65, on both sides of which the magnets 61,63 are disposed, the magnets 61,63 are rotated around the magnetic resistive element 40, inducing a change in resistance values of the magnetic resistive element patterns r1–r4.

Reference numeral 8 denotes the body of the positioner, the valve opening control device, to which compressed air is supplied as a source of control air for activating the air actuator 3, and a valve opening setting value is also sent through communication from a remote controller. The body of the positioner 8 receives middle-point potentials V1,V2 outputted from the output terminals of bridge circuit 13, and also supplies power to the input terminals of the bridge circuit 13.

The body of the positioner 8 operates by power supplied from the remote controller, as well as communicates with the remote controller by means of the 4–20 mA current transmission system. For compensating temperature characteristics of such circuit (not shown) a temperature sensor 9 is provided.

FIG. 2 is a system configuration for controlling the valve opening of the flow control valve 1 inclusive of the temperature information detecting device for the angle sensor 6 and the position control device. In FIG. 2, the same reference numerals as in FIG. 1 indicate the same components, and therefore descriptions thereof are omitted for brevity's sake.

Referring to FIG. 2, reference numeral 12 denotes magnetic field generating means for generating a magnetic field that acts on the angle sensor 6, which is, e.g. a permanent magnet and is relatively rotatable with respect to the bridge circuit configured by the magnetic resistive elements, 13 denotes the bridge circuit for the angle sensor 6, at one side of which magnetic resistive elements 14,17 facing each other are disposed, whereas at the other side of which magnetic resistive elements 15,16 facing each other are disposed. A constant current is supplied to two terminals facing each other at one side from the constant current supplying means 20 and is outputted from two terminals at the other side.

In the angle sensor 6, resistance values of each magnetic resistive element are changed in accordance with an angle at which the magnetic flux generated by the magnetic field generating means crosses the magnetic resistive elements 14–17 and the middle-point potentials V1,V2 are outputted from the output terminal. For this reason, the magnetic field generating means 12 is provided in advance with a mechanism that is relatively rotatable in accordance with the valve opening of the flow control valve 1 with respect to the bridge circuit 13. The mechanism has the structure where the pin 5 of the valve driving shaft 4 is engaged with the slit 7a formed on the feedback lever 7 whose one end is fixed to the axis of rotation of the angle sensor 6. This converts linear reciprocal motion of the valve driving shaft 4 into rotational motion of the axis of rotation of the angle sensor 6, so that the magnetic generating means 12 relatively rotates with respect to the bridge circuit 13.

The body of the positioner 8 communicates with the outside, as well as receives power via a 4–20 mA communication line from the outside. The signal converting means 29 is for extracting a communication signal from the 4–20 mA input signal. In FIG. 2, the setting value SP is extracted and given to control means 26. The constant voltage generating source 28 is for generating a power source for the constant voltage Vcc from the 4–20 mA input signal. The electrical configurations (not shown) in the body of the positioner 8 operates by power supplied from the constant voltage generating source 28. The constant current supplying means 20 is for supplying a constant current to the bridge circuit 13 of the angle sensor 6. Specifically, the constant current supplying means 20 takes the configuration where the output of a differential amplifier is fed to one end of the bridge circuit 13, other end A is fed back to an inverted input of the differential amplifier, and a reference voltage Vr is inputted to a non-inverted input of the differential amplifier. Since a current Ic is grounded through the bridge circuit 13 and a resister Rc, potential of connection A (inverted input of the differential amplifier) linking the bridge circuit 13 and the resistive element Rc becomes RC·Ic. The differential amplifier adjusts its output so as to maintain voltage of the ground A to the reference voltage Vr, so that it has the relation Vr=RC·Ic. Where Vr and Rc are constant and thus Ic also is constant. Reference numeral 21 denotes an A/D converter, which converts the middle-point potentials V1,V2 outputted as analog signals from the angle sensor 6 into digital signals, 22 denotes subtracting means for finding a difference between the middle-point potentials V1,V2 converted into digital signals, 23 denotes adding means (temperature information detecting means) for adding the middle-point potentials V1,V2, 24 denotes positional information detecting means for detecting a valve position of the flow control valve 1 whose valve opening is controlled based on the output of the adding means 22, 25 denotes temperature compensating means (temperature information detecting means) for detecting a temperature of the bridge circuit 13 based on the output of the adding means 23, and for compensating the valve position of the flow control valve 1 detected by the positional information detecting means 24 in accordance with the detected temperature, 26 denotes control means for calculating the amount of control of the valve position of the flow control valve 1 based on the valve position of the flow control valve 1 outputted from the positional information detecting means 24 and an external setting value for the valve position of the flow control valve 1 given from the external controller, and for outputting it as a control signal. In the first embodiment, the means denoted by reference numerals 22-26 are all implemented by programs that run on a CPU. Reference numeral 27 denotes electro-air converting means for controlling a nozzle-flapper mechanism in response to the control signal, for generating a control air from the compressed air, and for supplying it to the air actuator 3.

The operation of the temperature information detecting device of the first embodiment will now be described.

Resistance values of the magnetic resistive elements 14,17 constituting the bridge circuit 13 for the angle sensor 6 are expressed by a formula $R/2+2(\Delta R \cdot \cos 2\theta)/2$, and of the magnetic resistive elements 15,16 by a formula $R/2-2(\Delta R \cdot \cos 2\theta)/2$ where R is the sum of maximum value and minimum value of the resistance values of the magnetic resistive elements, $\Delta R$ is a difference between the maximum value and the minimum value of the resistance values of the magnetic resistive elements, and $\theta$ is an angle at which a longitudinal direction of the magnetic resistive elements and the magnetic flux cross. In the bridge circuit 13, it has the relation (resistance value of magnetic resistive element 14)+(resistance value of magnetic resistive element 16)= (resistance value of magnetic resistive element 15)+ (resistance value of magnetic resistive element 17). An electric current of Ic/2 flows through a circuit consisting of the magnetic resistive elements 14,16 and a circuit consisting of magnetic resistive elements 15,17.

Consequently, the angle sensor 6 outputs the bridge middle-point potentials V1,V2 expressed by formulae $V1= (R \cdot Ic/4)-(\Delta R \cdot Ic \cdot \cos 2\theta)/4$, $V2=(R \cdot Ic/4)+(\Delta R \cdot Ic \cdot \cos 2\theta)/4$, which contains a component that varies with the temperature of the magnetic resistive elements, and a component that varies with the angle $\theta$ at which the magnetic flux generated by the magnetic field generating means and the magnetic resistive elements cross, where $R \cdot Ic/4$ is the component that varies with temperature of the magnetic resistive elements, and $(\Delta R \cdot Ic \cdot \cos 2\theta)/4$ is the component that varies with the temperature of the magnetic resistive elements and on the angle $\theta$.

The bridge middle-point potentials V1,V2 are converted into digital signals by the A/D converter 21. Then, a component depending on the angle $\theta$ is found by calculating a difference between the digitized bridge middle-point potentials V1,V2 by the subtracting means 22 to input the subtracted result V1−V2 to the positional information detecting means 24. The positional information detecting means 24 finds the present valve positional information of the flow control valve 1 based on the subtracted result V1−V2.

The bridge middle-point potentials V1,V2 outputted from the angle sensor 6 and converted into digital signals are also supplied to the adding means 23, in which the added result V1+V2 is obtained independent of the angle $\theta$ by calculating the sum of the middle-point potentials V1,V2 of the branches of the bridges. The added result V1+V2 is expressed by a formula $R \cdot Ic/2$, which is a voltage value that is not dependent on the angle $\theta$ but only on a temperature change in the mean resistance value R/2 of the temperature-dependent magnetic resistive elements. The voltage varies in accordance with the mean resistance value R/2, and is similar by appearance to the case where a constant current flows through a typical metal resistor.

The added result V1+V2 independent of the angle $\theta$ is in turn fed to the temperature compensating means 25, in which a temperature of the bridge circuit 13 for the angle sensor 6 is found based on the voltage value $R \cdot Ic/2$. The compensation value is then determined corresponding to the temperature of the bridge circuit 13 for the angle sensor 6. The compensation value is used in the positional information detecting means 24 for compensation in finding the present valve opening of the flow control valve 1 and cancels an error of the valve opening caused in proportion to the temperature of the bridge circuit 13 for the angle sensor 6.

The position detecting means 24 outputs to the control means 26 the valve positional information PV whose error caused in proportion to the temperature has already been canceled. The control means 26 receives an external setting value from the external controller. The control means generates a control signal based on a difference between the external setting value and the valve positional information PV, and outputs it to the electro-air converting means 27. The electro-air converting means 27 controls a magnetic air valve in response to the control signal and generates a control air signal from the separately supplied compressed air to supply it to the air actuator 3. The air actuator 3 pushes down the valve driving shaft 4 by the aid of the control air or pulls it up in order to automatically control the valve position of the flow control valve 1 to a valve opening corresponding to the external setting value.

As mentioned above, according to the first embodiment the use of the middle-point potentials V1,V2 of bridges of the bridge circuit 13 outputted from the angle sensor 6 for detecting the valve opening of the flow control valve 1 enables detection of the temperature of the bridge circuit 13. Thus, even when the first embodiment is applied to the case where the angle sensor 6 is separated from the body of the positioner 8, the temperature of the angle sensor 6 can directly be detected, without separately providing any additional temperature sensor for detecting temperature information of the angle sensor 6. This accomplishes further simplification of the body of the positioner 8. Moreover, it eliminates cables for conducting the temperature information to the body of the positioner 8, thereby simplifying the structure inclusive of wiring.

Having the ability to directly detect the temperature of the bridge circuit 13 using the middle-point potentials V1,V2 of bridges of the bridge circuit 13, the present invention allows provision of the temperature compensating device for the angle sensor realizing a temperature compensation with high accuracy. Further, it permits provision of the positional information detecting device realizing flow control with high accuracy.

Beside being able to detect the temperature of the bridge circuit 13 using the middle-point potentials V1,V2 of bridges outputted from the angle sensor for detecting the valve position of the flow control valve 1, the A/D converter 21 provided in the body of the positioner 8 can have only a channel for converting the middle-point potentials V1,V2 of bridges into digital signals. Accordingly, it obviates, unlike the prior art, a channel for converting the middle-point potentials V1,V2 of bridges outputted from the angle sensor 6 into digital signals, and a channel for converting the temperature information outputted from the temperature sensor into digital signals. This provides the temperature information detecting device for the angle sensor and the position detecting device made at reduced cost.

In addition, the use of the added result of the middle-point potentials V1,V2 of bridges of the bridge circuit 13 outputted from the angle sensor 6 for detecting the valve position of the flow control valve 1 enables detection of the temperature of the bridge circuit 13. Thus, a software-oriented processing is implemented by using software such as a computing software without relying on hardware such as a temperature sensor, which enhances flexibility and versatility of the device.

Figure 3:
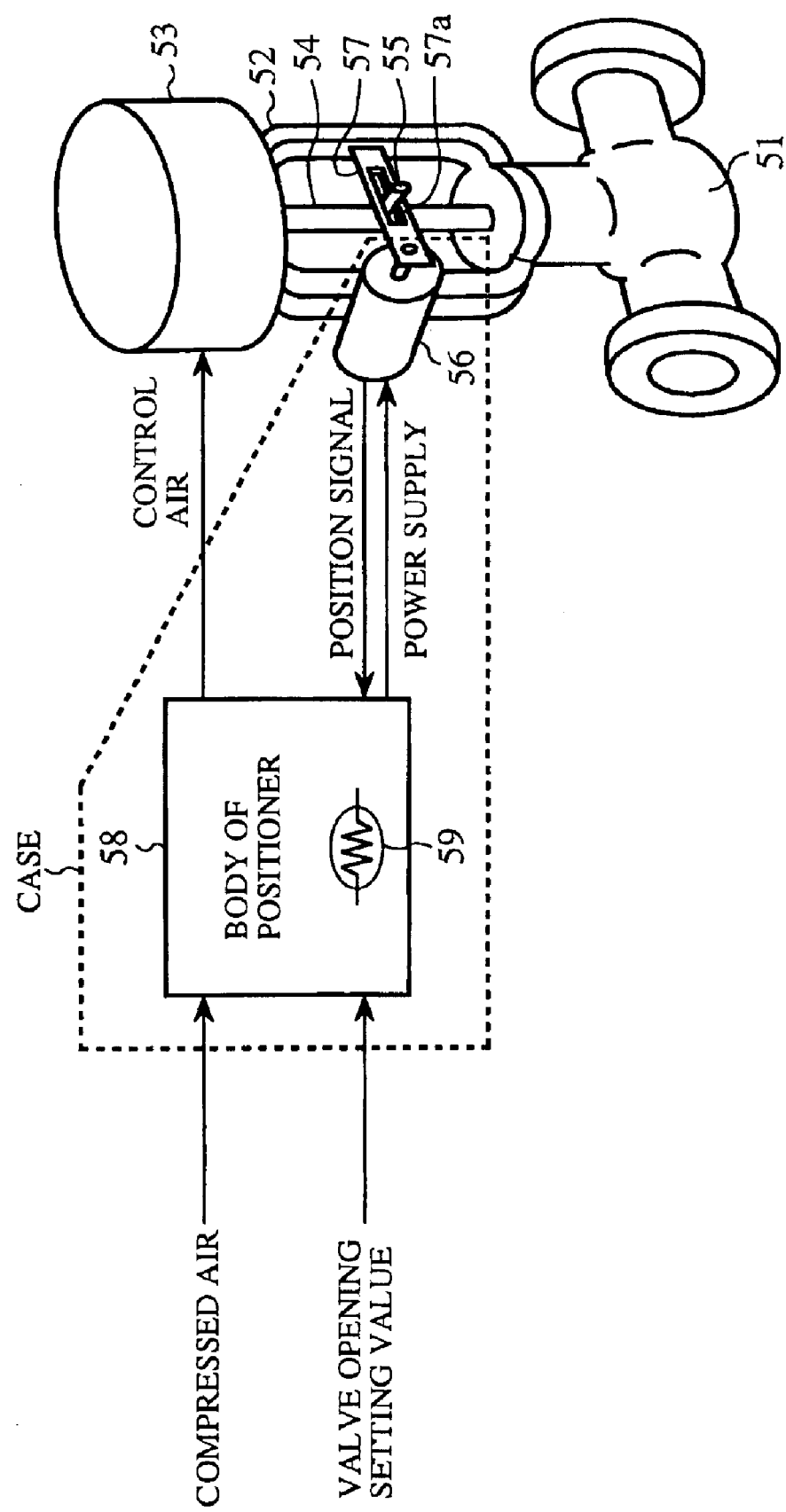
FIG. 3 is a block diagram showing the flow control valve having the structure where the body of the positioner is housed together with the angle sensor.

While in the first embodiment a description is made of the structure where the body of the positioner 8 is housed as shown in FIG. 1 as separated from the angle sensor 6, needless to say, the scope of the invention is not limited thereto. The present invention also has application to the case where the body of the positioner 8 and the angle sensor 6 are both housed together as shown in FIG. 3. This guarantees more precise measurement of the temperature of the angle sensor 6. Also, it is possible to use the angle sensor 56 as a temperature sensor instead of the temperature sensor 59, which can then be omitted.

It is readily apparent that the above-described navigation device and a method of searching route meet all of the objects mentioned above and also has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. A device for acquiring temperature information indicative of ambient temperature of an angle sensor having a bridge circuit composed of four magnetoresistive elements whose resistive properties vary with direction of a magnetic flux across said bridge circuit and with temperature, and magnetic field generating means for generating a magnetic field that acts on said bridge circuit to produce said magnetic flux, comprising:
   a constant current supply that provides a constant electric current to said bridge circuit; and
   temperature information determining means for obtaining a signal indicative of ambient temperature of said angle sensor, said signal being derived from midpoint voltage potentials of branches of said bridge circuit; wherein said temperature information determining means comprises means for adding together midpoint voltage potentials of branches of said bridge circuit.

2. A device as set forth in claim 1, further comprising an analog-to-digital converter for converting said midpoint voltage potentials to digital signals before said midpoint voltage potentials are added together by said adding means.

3. A device for acquiring temperature information indicative of ambient temperature of an angle sensor having a bridge circuit composed of four magnetoresistive elements whose resistive properties vary with direction of a magnetic flux across said bridge circuit and with temperature, and magnetic field generating means for generating a magnetic field that acts on said bridge circuit to produce said magnetic flux, comprising:
   a constant current supply that provides a constant electric current to said bridge circuit; and
   temperature information determining means for obtaining a signal indicative of ambient temperature of said angle sensor, said signal being derived from midpoint voltage potentials of branches of said bridge circuit; wherein said constant current supply comprises a differential amplifier that receives an output of said bridge circuit at one input terminal thereof and receives a constant reference voltage at another input terminal thereof, and outputs said constant electric current from an output terminal thereof to an input terminal of said bridge circuit.

4. A position detection device, comprising:
   an angle sensor having a bridge circuit composed of four magnetoresistive elements whose resistive properties vary with direction of a magnetic flux across said bridge circuit and with temperature, and magnetic field generating means for generating a magnetic field that acts on said bridge circuit to produce said magnetic flux, said magnetic field generating means being coupled to one end of a movable member that changes said magnetic flux direction as a function of a changing angle;
   a constant current supply that provides a constant electric current to said bridge circuit;
   angle determining means for obtaining a first signal indicative of an angle of said movable member, said first signal being derived from midpoint voltage potentials of branches of said bridge circuit;
   temperature information determining means for obtaining a second signal indicative of ambient temperature of said angle sensor, said second signal being derived from midpoint voltage potentials of branches of said bridge circuit;
   positional information determining means for determining a position of a mechanism coupled to another end of said movable member, based on said first signal; and
   temperature compensation means for correcting the position determined by said positional information determining means for errors caused by changes in said ambient temperature, based on said second signal; wherein said angle determining means comprises means for subtracting one midpoint voltage potential of a first branch of said bridge circuit from a second midpoint voltage potential of a second branch of said bridge circuit.

5. A position detection device, comprising:
   an angle sensor having a bridge circuit composed of four magnetoresistive elements whose resistive properties vary with direction of a magnetic flux across said bridge circuit and with temperature, and magnetic field generating means for generating a magnetic field that acts on said bridge circuit to produce said magnetic flux, said magnetic field generating means being coupled to one end of a movable member that changes said magnetic flux direction as a function of a changing angle;
   a constant current supply that provides a constant electric current to said bridge circuit;
   angle determining means for obtaining a first signal indicative of an angle of said movable member, said first signal being derived from midpoint voltage potentials of branches of said bridge circuit;
   temperature information determining means for obtaining a second signal indicative of ambient temperature of said angle sensor, said second signal being derived from midpoint voltage potentials of branches of said bridge circuit;
   positional information determining means for determining a position of a mechanism coupled to another end of said movable member, based on said first signal; and
   temperature compensation means for correcting the position determined by said positional information determining means for errors caused by changes in said ambient temperature, based on said second signal; wherein said temperature information determining means comprises means for adding together midpoint voltage potentials of branches of said bridge circuit.

6. A position detection device as set forth in claim 5, further comprising an analog-to-digital converter for converting said midpoint voltage potentials to digital signals before said midpoint voltage potentials are added together by said adding means.

7. A position detection device, comprising:
   an angle sensor having a bridge circuit composed of four magnetoresistive elements whose resistive properties vary with direction of a magnetic flux across said bridge circuit and with temperature, and magnetic field generating means for generating a magnetic field that acts on said bridge circuit to produce said magnetic flux, said magnetic field generating means being coupled to one end of a movable member that changes said magnetic flux direction as a function of a changing angle;

a constant current supply that provides a constant electric current to said bridge circuit;

angle determining means for obtaining a first signal indicative of an angle of said movable member, said first signal being derived from midpoint voltage potentials of branches of said bridge circuit;

temperature information determining means for obtaining a second signal indicative of ambient temperature of said angle sensor, said second signal being derived from midpoint voltage potentials of branches of said bridge circuit;

positional information determining means for determining a position of a mechanism coupled to another end of said movable member, based on said first signal; and temperature compensation means for correcting the position determined by said positional information determining means for errors caused by changes in said ambient temperature, based on said second signal; wherein said constant current supply comprises a differential amplifier that receives an output of said bridge circuit at one input terminal thereof and receives a constant reference voltage at another input terminal thereof, and outputs said constant electric current from an output terminal thereof to an input terminal of said bridge circuit.

8. A flow control valve system, comprising:

a flow control valve having an inlet for receiving a fluid, an outlet for discharging said fluid, and a controllable flow mechanism between said inlet and said outlet for controlling flow of said fluid between said inlet and said outlet;

a movable member having one end thereof attached to said controllable flow mechanism;

an angle sensor having a bridge circuit composed of four magnetoresistive elements whose resistive properties vary with direction of a magnetic flux across said bridge circuit and with temperature, and magnetic field generating means for generating a magnetic field that acts on said bridge circuit to produce said magnetic flux, said magnetic field generating means being coupled to another end of said movable member, such that changes in position of said controllable flow mechanism result in changes in angle of said movable member, which in turn result in changes in said magnetic flux;

a constant current supply that provides a constant electric current to said bridge circuit;

angle determining means for obtaining a first signal indicative of an angle of said movable member, said first signal being derived from midpoint voltage potentials of branches of said bridge circuit;

temperature information determining means for obtaining a second signal indicative of ambient temperature of said angle sensor, said second signal being derived from midpoint voltage potentials of branches of said bridge circuit;

positional information determining means for determining a position of a mechanism coupled to another end of said movable member, based on said first signal;

temperature compensation means for correcting the position determined by said positional information determining means for errors caused by changes in said ambient temperature, based on said second signal; and control means for controlling the position of said controllable flow mechanism by comparing an external valve setting value with a corrected position signal produced by said temperature compensation means and providing a control signal to said controllable flow mechanism in accordance with a result of the comparison; wherein said angle determining means comprises means for subtracting one midpoint voltage potential of a first branch of said bridge circuit from a second midpoint voltage potential of a second branch of said bridge circuit.

9. A flow control valve system, comprising:

a flow control valve having an inlet for receiving a fluid, an outlet for discharging said fluid, and a controllable flow mechanism between said inlet and said outlet for controlling flow of said fluid between said inlet and said outlet;

a movable member having one end thereof attached to said controllable flow mechanism;

an angle sensor having a bridge circuit composed of four magnetoresistive elements whose resistive properties vary with direction of a magnetic flux across said bridge circuit and with temperature, and magnetic field generating means for generating a magnetic field that acts on said bridge circuit to produce said magnetic flux, said magnetic field generating means being coupled to another end of said movable member, such that changes in position of said controllable flow mechanism result in changes in angle of said movable member, which in turn result in changes in said magnetic flux;

a constant current supply that provides a constant electric current to said bridge circuit;

angle determining means for obtaining a first signal indicative of an angle of said movable member, said first signal being derived from midpoint voltage potentials of branches of said bridge circuit;

temperature information determining means for obtaining a second signal indicative of ambient temperature of said angle sensor, said second signal being derived from midpoint voltage potentials of branches of said bridge circuit;

positional information determining means for determining a position of a mechanism coupled to another end of said movable member, based on said first signal;

temperature compensation means for correcting the position determined by said positional information determining means for errors caused by changes in said ambient temperature, based on said second signal; and control means for controlling the position of said controllable flow mechanism by comparing an external valve setting value with a corrected position signal produced by said temperature compensation means and providing a control signal to said controllable flow mechanism in accordance with a result of the comparison; wherein said temperature information determining means comprises means for adding together midpoint voltage potentials of branches of said bridge circuit.

10. A flow control valve system as set forth in claim 9, further comprising an analog-to-digital converter for converting said midpoint voltage potentials to digital signals before said midpoint voltage potentials are added together by said adding means.

11. A flow control valve system, comprising:

a flow control valve having an inlet for receiving a fluid, an outlet for discharging said fluid, and a controllable flow mechanism between said inlet and said outlet for controlling flow of said fluid between said inlet and said outlet;

a movable member having one end thereof attached to said controllable flow mechanism;

an angle sensor having a bridge circuit composed of four magnetoresistive elements whose resistive properties vary with direction of a magnetic flux across said bridge circuit and with temperature, and magnetic field generating means for generating a magnetic field that acts on said bridge circuit to produce said magnetic flux, said magnetic field generating means being coupled to another end of said movable member, such that changes in position of said controllable flow mechanism result in changes in angle of said movable member, which in turn result in changes in said magnetic flux;

a constant current supply that provides a constant electric current to said bridge circuit;

angle determining means for obtaining a first signal indicative of an angle of said movable member, said first signal being derived from midpoint voltage potentials of branches of said bridge circuit;

temperature information determining means for obtaining a second signal indicative of ambient temperature of said angle sensor, said second signal being derived from midpoint voltage potentials of branches of said bridge circuit;

positional information determining means for determining a position of a mechanism coupled to another end of said movable member, based on said first signal;

temperature compensation means for correcting the position determined by said positional information determining means for errors caused by changes in said ambient temperature, based on said second signal; and control means for controlling the position of said controllable flow mechanism by comparing an external valve setting value with a corrected position signal produced by said temperature compensation means and providing a control signal to said controllable flow mechanism in accordance with a result of the comparison; wherein said constant current supply comprises a differential amplifier that receives an output of said bridge circuit at one input terminal thereof and receives a constant reference voltage at another input terminal thereof, and outputs said constant electric current from an output terminal thereof to an input terminal of said bridge circuit.

* * * * *